Patented July 23, 1929.

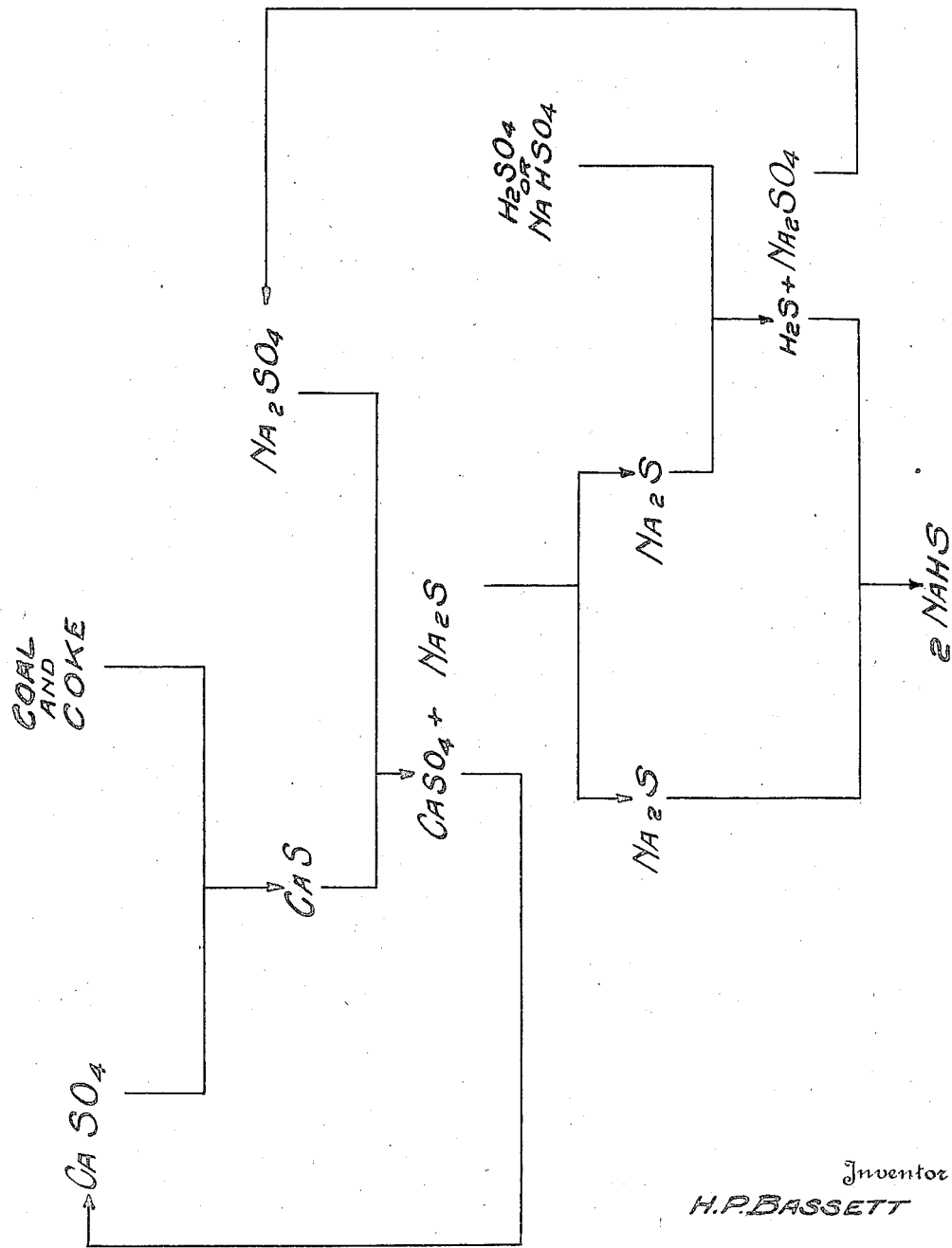

1,722,170

UNITED STATES PATENT OFFICE.

HARRY P. BASSETT, OF CYNTHIANA, KENTUCKY.

PRODUCTION OF HYDROGEN SODIUM SULPHIDE.

Application filed October 9, 1925. Serial No. 61,594.

This invention relates to the production of hydrogen sodium sulphide from calcium sulfate in a process which is to a considerable extent cyclic, in that several of the products produced therein are adapted for use in the treatment of additional material at different stages of the process thereby effecting a substantial economy in the production of the hydrogen sodium sulphide.

The single figure of the drawing is a flow sheet illustrating my invention.

In the practice of my process in its preferred form, I first heat to a reducing temperature a mixture of pulverized calcium sulfate with about 25 per cent by weight of carbonaceous matter preferably a mixture of powdered coal and coke, the coal and coke being present in the proportions of 4 parts by weight of the former to 3 parts by weight of the latter. The mixture is preferably subjected to a temperature of from about 1100 to 1600° F., in a batch furnace, such for example, as the Brockner furnace, or in a rotary tube furnace of ordinary construction. The mixture is heated in a reducing atmosphere and in the treatment of 2000 pounds of calcium sulfate, the reducing operation at the preferred temperature indicated above ordinarily requires about one hour or longer.

The product of the reaction is coke, which may be used in the treatment of additional calcium sulfate, and a mixture of calcium compounds consisting entirely or almost entirely of calcium sulphide, calcium sulfite and calcium oxid. The mixture of calcium compounds and coke is preferably allowed to cool out of contact with the air.

The mixture of calcium compounds and coke is then placed in a closed chamber adapted to withstand considerable internal pressure and to the mixture is added a solution of sodium sulfate of any desired strength although preferably of a strength below saturation, the amount of sodium sulfate used being less than in molecular proportions with respect to the calcium sulphide present. The mixture is then heated under a pressure which is essentially in excess of atmospheric pressure and I prefer to heat the mixture under a pressure of about 25 to 30 pounds in excess of atmospheric pressure, a temperature of around 236° to 250° F. being well suited to the reaction. The treatment must be conducted at superatmospheric pressure but some measure of success is obtainable if the pressure is only slightly above atmospheric pressure as, for example, at 5 pounds superatmospheric pressure although I prefer to use higher pressures.

As a result of this treatment, sodium sulphide and calcium sulfate result from the reaction of sodium sulfate and calcium sulphide.

The sodium sulphide is leached out of the resulting mixture and the solution after being filtered contains sodium sulphide sufficiently pure for the production of hydrogen sodium sulphide adapted for use in the artificial silk industry.

The coke and calcium sulfate remaining after the leaching operation may be used with additional calcium sulfate and coal in the first stage of the process.

The filtered solution of sodium sulphide is divided into two approximately equal parts and to one of the parts is added sulfuric acid or its equivalent such as sodium hydrogen sulfate to react with the sodium sulphide to produce hydrogen sulphide and sodium sulfate. The hydrogen sulphide is conducted into the other part of the filtered sodium sulphide solution producing hydrogen sodium sulphide adapted without further treatment for use in the artificial silk and other chemical industries. The remaining sodium sulfate is used in the treatment of additional quantities of calcium sulphide in an intermediate step of my process.

My process produces hydrogen sodium sulphide of a high degree of purity and at a low cost of production, the utilization of products of the steps of the process in the treatment of additional quantities of material at earlier stages of the process serving to effect substantial economies.

While I have described in detail the preferred practice of my process, it is to be understood that the procedure may be variously modified and that other suitable reducing apparatus than those herein referred to may be employed without departing from the spirit of my invention or the scope of the subjoined claims.

Having thus described my invention, I claim:

1. The process of making hydrogen sodium sulphide comprising heating calcium sulfate to a reducing temperature with carbonaceous matter to produce calcium sulphide, calcium sulfite and calcium oxid, heating such calcium salts with a solution of sodium sulfate, such sodium sulfate being present in less than molecular proportions with respect to the calcium sulphide present, at superatmospheric pressure to produce sodium sulphide, leaching the product of the reaction, dividing the solution resulting from the leaching operation into two parts, acting upon one of the parts with an acid adapted to transform sodium sulphide into hydrogen sulphide and conducting the hydrogen sulphide produced into the other part of the solution resulting from the leaching operation to produce hydrogen sodium sulphide.

2. The process of making hydrogen sodium sulphide comprising heating a mixture of calcium sulfate, coal and coke to a reducing temperature to produce coke and a mixture of calcium compounds comprising calcium sulphide, calcium sulfite and calcium oxid, heating the products of the reducing reaction at superatmospheric pressure with a solution of sodium sulfate, the sodium sulfate being present in less than molecular proportions with respect to the calcium sulphide present, to produce sodium sulphide and calcium sulfate, leaching the product of the reaction, separating the solution resulting from the leaching operation into two parts, adding sulfuric acid to one of the parts to produce hydrogen sulphide and sodium sulfate, and conducting the hydrogen sulphide into the other part to produce hydrogen sodium sulphide.

3. The process of making hydrogen sodium sulphide comprising heating a mixture of calcium sulfate, coal and coke to a reducing temperature to produce coke and a mixture of calcium compounds comprising calcium suphide, calcium sulfite and calcium oxid, heating the products of the reducing reaction at superatmospheric pressure with a solution of sodium sulfate, the sodium sulfate being present in less than molecular proportions with respect to the calcium sulphide present, to produce sodium sulphide and calcium sulfate, leaching the product of the reaction, separating the solution resulting from the leaching operation into two parts, adding sulfuric acid to one of the parts to produce hydrogen sulphide and sodium sulfate, conducting the hydrogen sulphide into the other part to produce hydrogen sodium sulphide, and employing the mixture of coke and calcium sulfate resulting from the second step of the process in the first step of the process.

4. The process of making hydrogen sodium sulphide comprising heating a mixture of calcium sulfate, coal and coke to a reducing temperature to produce coke and a mixture of calcium compounds comprising calcium sulphide, calcium sulfite and calcium oxid, heating the products of the reducing reaction at superatmospheric pressure with a solution of sodium sulfate, the sodium sulfate being present in less than molecular proportions with respect to the calcium sulphide present, to produce sodium sulphide and calcium sulfate, leaching the product of the reaction, separating the solution resulting from the leaching operation into two parts, adding sulfuric acid to one of the parts to produce hydrogen sulphide and sodium sulfate, conducting the hydrogen sulphide into the other part to produce hydrogen sodium sulphide, employing the mixture of coke and calcium sulfate resulting from the second step of the process in the first step of the process, and employing the sodium sulfate produced in the reaction of sulfuric acid on the sodium sulphide in the treatment of additional calcium sulphide in the second step of the process.

5. In the herein described process, the steps of heating a mixture of calcium sulfate and carbonaceous matter to a reducing temperature to produce coke and calcium compounds comprising calcium sulphide, calcium sulfite and calcium oxid, adding sodium sulfate in solution in less than molecular proportions with respect to the calcium sulphide present, heating the mixture at superatmospheric pressure, leaching the product, and employing the residue from the leaching operation in the first step of the process.

In testimony whereof I affix my signature.

HARRY P. BASSETT.